No. 870,731. PATENTED NOV. 12, 1907.
F. F. LANDIS.
SEPARATING GRATE FOR THRESHING MACHINES.
APPLICATION FILED JUNE 20, 1902.
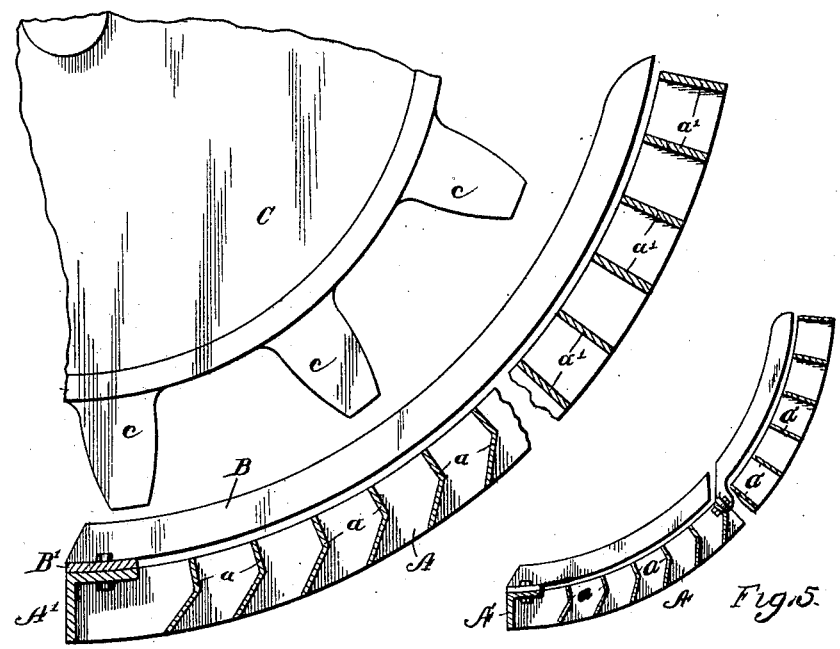
Fig. 1.
Fig. 5.
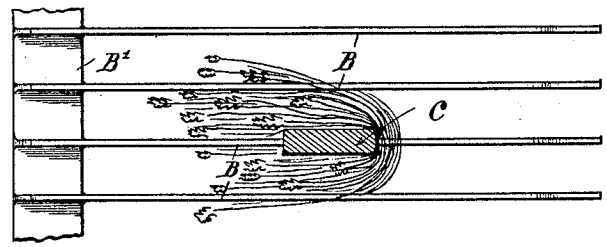
Fig. 2.
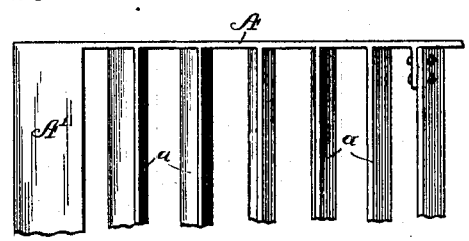
Fig. 3.
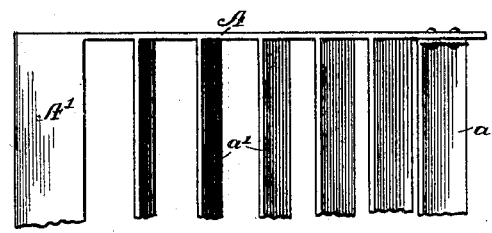
Fig. 4.
Witnesses
Inventor
Frank F. Landis,
By G. W. Bradford
Attorney

UNITED STATES PATENT OFFICE.

FRANK F. LANDIS, OF WAYNESBORO, PENNSYLVANIA.

SEPARATING-GRATE FOR THRESHING-MACHINES.

No. 870,731.　　　　Specification of Letters Patent.　　　Patented Nov. 12, 1907.

Application filed June 20, 1902. Serial No. 112,470.

*To all whom it may concern:*

Be it known that I, FRANK F. LANDIS, a citizen of the United States, residing at Waynesboro, in the county of Franklin and State of Pennsylvania, have invented certain new and useful Improvements in Separating-Grates for Threshing-Machines, of which the following is a specification.

My said invention consists in an improved construction of separating grates for threshing machines of that character designed for use in near proximity to the threshing cylinder for the purpose of separating the grain from the straw as it passes between the concaves and said cylinder, whereby a comparatively inexpensive, and at the same time efficient, construction of grate of this character is provided, as will be hereinafter more fully described and claimed.

Referring to the accompanying drawings, which are made a part hereof, and on which similar reference characters indicate similar parts: Figure 1 is a longitudinal section through a grate of the character above mentioned, a portion of the cylinder being also shown therewith to illustrate their relative positions in the threshing machine, Fig. 2 a top or plan view of a section of the upper part of said grate, Fig. 3 a top or plan view of the lower or under part of said grate, Fig. 4 a similar view of a modified form of said part, which is also illustrated in cross section at the right in Fig. 1, and, Fig. 5 a view similar to a portion of Fig. 1, illustrating a modified form.

In said drawings the portions marked A represent the lower portion of the grate, B the top portion, and C the cylinder.

The lower portion A of the grate when constructed for a narrow or small machine can be cast in one piece and consists of longitudinal side or end pieces joined by transverse bars or webs $a$. Said transverse bars or webs $a$ are preferably in the form of an angle as illustrated at the left in Fig. 1, to better serve the purpose of deflecting the grain in the proper direction and preventing straws from passing therethrough. It may, however, be formed of straight bars $a'$, as shown at the right in Fig. 1, which extend in a substantially radial direction. When constructing a grate for a wide or large machine the bars $a$ are preferably attached by rivets or bolts to the end portion A as shown at the right in Fig. 3, or the ends of said bars may be provided with an angle end and bolted to the part A as shown at the right in Fig. 4. The front or lower ends of the portion A are connected by the transverse bar $A'$ of sufficient strength and rigidity for the purpose.

The upper portion B of the grate consists of curved bars extending in a longitudinal direction, or in line with the travel of the straw, joined at their lower ends by a cross bar $B'$ which is secured to the top of cross bar $A'$ in any suitable manner. Said bars are curved and arranged one under each circumferential row of cylinder teeth and in near proximity thereto.

When the grate is required of such length in the direction of the travel of the straw that the curved bars forming the portion B are too long to retain proper rigidity the said curved bars can be made in two or more sections the upper or second section being secured to one of the lower cross bars $a$ as shown in the modified form illustrated in Fig. 5. In this view I also show the curved bars formed with flanges and attached directly to bar $A'$ of the lower section.

Other modifications in details of construction may, of course, be made without departing from my invention.

The grate is mounted in the threshing machine immediately behind the concave and below the cylinder in any approved manner, being supported in relation to the cylinder, substantially as shown in Fig. 1.

In operation the straw is carried over the grate by the rotary motion of the cylinder, the grain contained in said straw is freed therefrom by centrifugal force and thrown between the bars of the portion B, and downwardly against the transverse bars $a$ and $a'$ of the portion A beneath. Said transverse bars serve to arrest and deflect the said grain out of the path of the straw. The bars B being arranged directly beneath the point of the teeth $c$ of the cylinder C, serve to support said straw out of contact with the transverse bars and thus guide it in its passage over said grate without any undue friction. The straw is also permitted to spread out between said bars and loosen up so that the grain held therein is more readily freed therefrom.

Having thus fully described my said invention, what I claim as new and desire to secure by Letters Patent, is:

1. In a threshing machine, the combination, with the cylinder, of a separating grate comprising a lower section composed of longitudinal sides and transverse connecting bars, and an upper section mounted thereon composed of bars arranged with their upper edges in line with and immediately beneath and close to the points of the cylinder teeth and extending in the direction of the travel of the straw, substantially as set forth.

2. The combination with the cylinder of a threshing machine, of a separating grate comprising a lower portion having side pieces and transverse connecting webs, and an upper portion mounted on said lower portion and connected therewith at its lower end having a supporting bar at its said lower end and longitudinally extending curved bars, the lower edges of which are supported above and free from the upper edges of the transverse bars of said lower portion, substantially as set forth.

3. A separating grate for threshing machines comprising a lower portion having longitudinal sides and transverse connecting webs formed as an integral structure, and an upper portion consisting of a transverse supporting bar at one end and longitudinally extending curved bars each of which is mounted at one end on said supporting bar, said supporting bar being mounted on said lower portion and supporting said upper portion with its longitudinal bars free from said lower portion, substantially as set forth.

4. The combination, with the cylinder, of a separating grate for threshing machines, comprising a lower portion formed curved to correspond substantially with the cylinder and having transverse bars, and an upper portion having bars extending in line with the travel of the straw across and above the plane of said transverse bars, said upper bars being arranged closely adjacent to the points of the cylinder teeth and formed with free ends, substantially as set forth.

5. The combination, with the cylinder, of a separating grate for threshing machines, comprising a lower portion curved nearly concentric with the cylinder and having longitudinally extending sides and transverse deflecting plates mounted between said sides, and an upper portion mounted thereon and having continuous bars correspondingly curved and arranged at intervals throughout the width of said lower portion and directly in the path of the circumferential rows of teeth on the cylinder, substantially as set forth.

6. A separating grate for threshing machines composed of an under or lower grate formed of bars transverse to the travel of the straw and an upper grate mounted thereon composed of curved bars extending in the direction of the travel of the straw and arranged in line with and closely adjacent to the circumferential rows of teeth on the cylinder, substantially as set forth.

In witness whereof, I, have hereunto set my hand and seal at Waynesboro, Pennsylvania, this 20 day of May, A. D. nineteen hundred and two.

FRANK F. LANDIS. [L. S.]

Witnesses:
 M. F. NEWMAN,
 ALF. N. RUSSELL.